Nov. 16, 1965  G. MAXON, JR  3,217,616
LOAD TRANSFER MEANS FOR CONTRACTION
JOINTS IN CONCRETE PAVEMENT
Filed Nov. 1, 1962  5 Sheets-Sheet 5

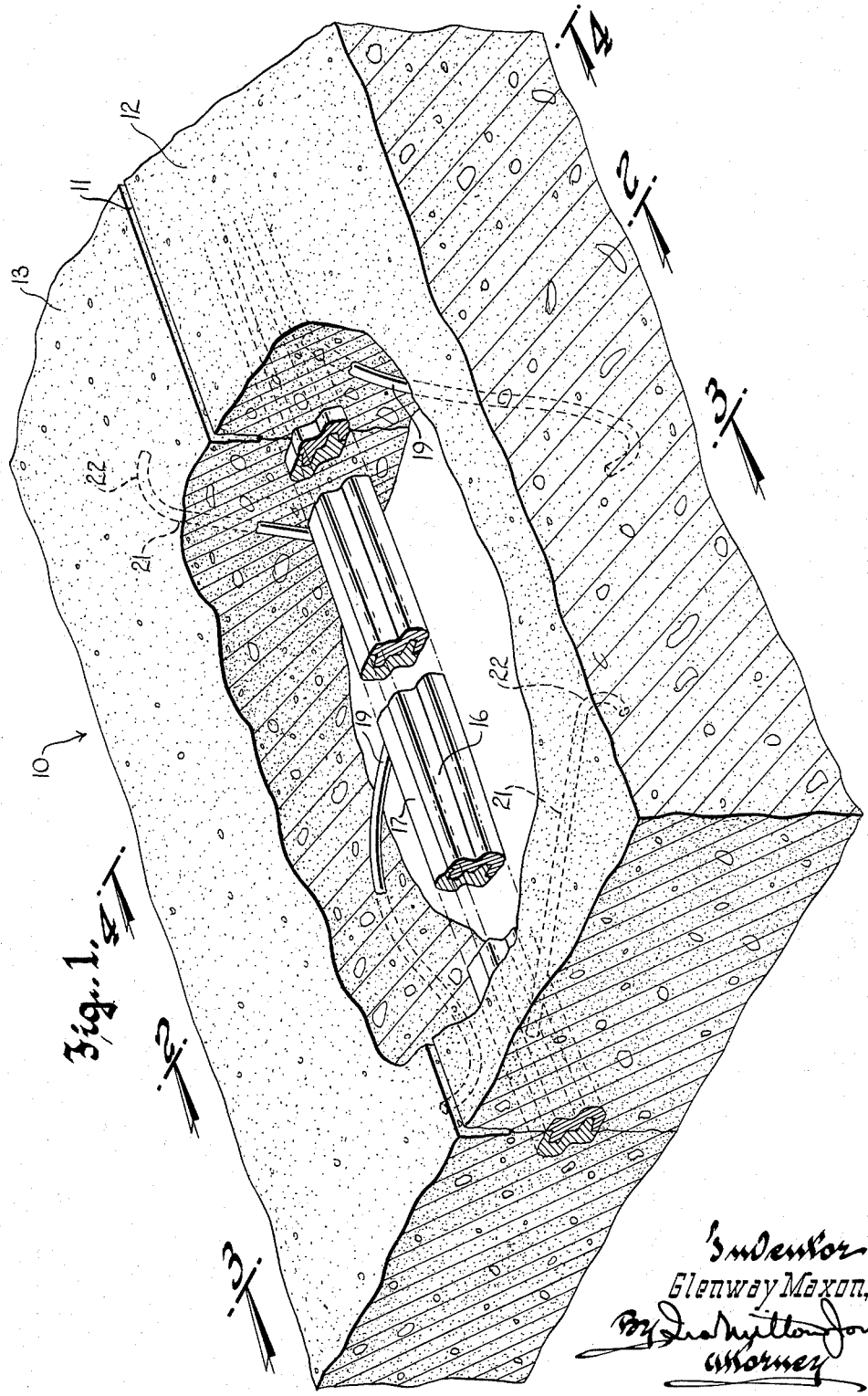

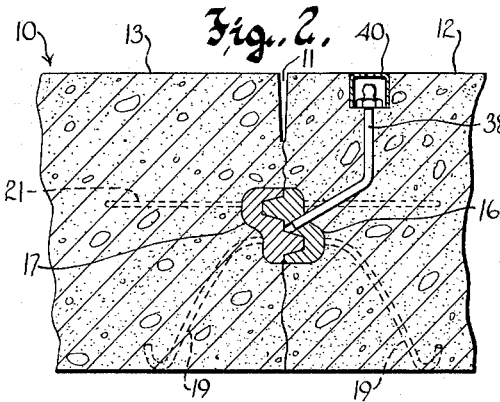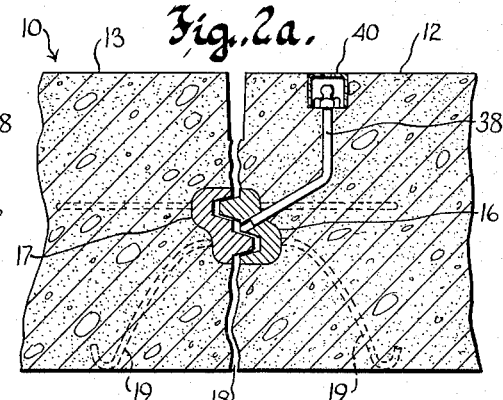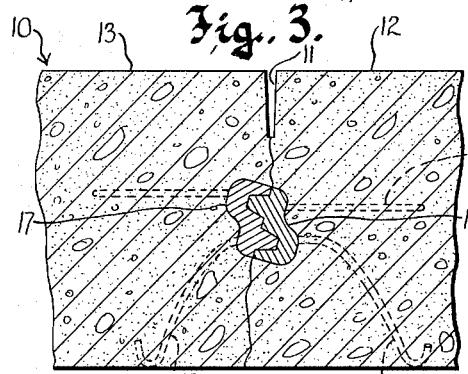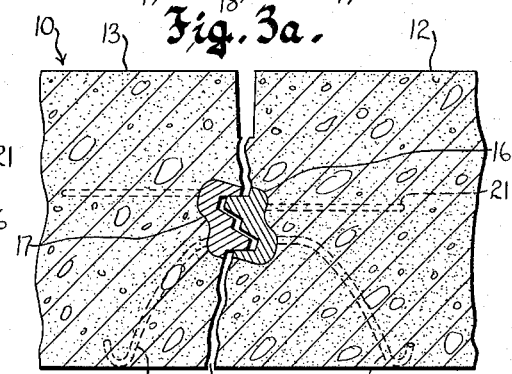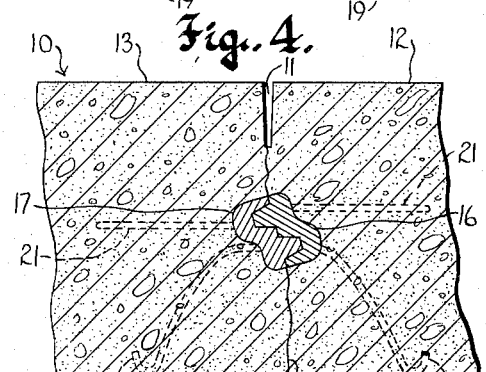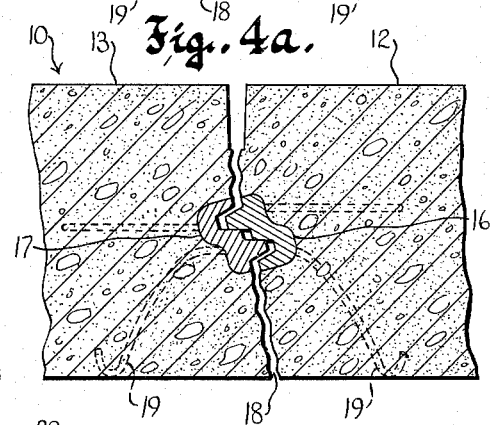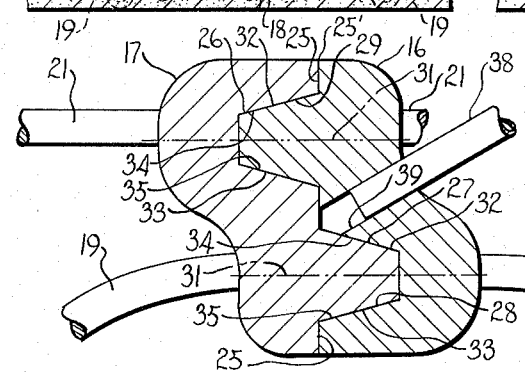

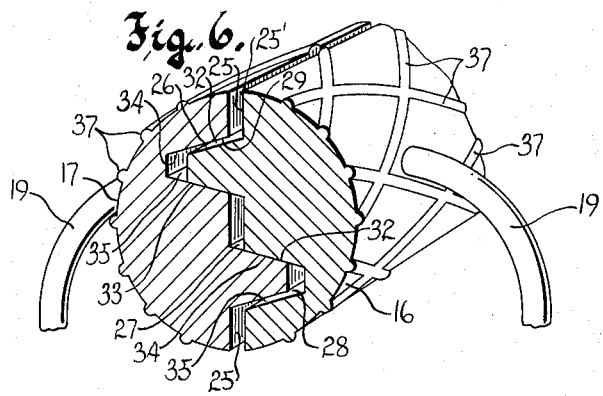
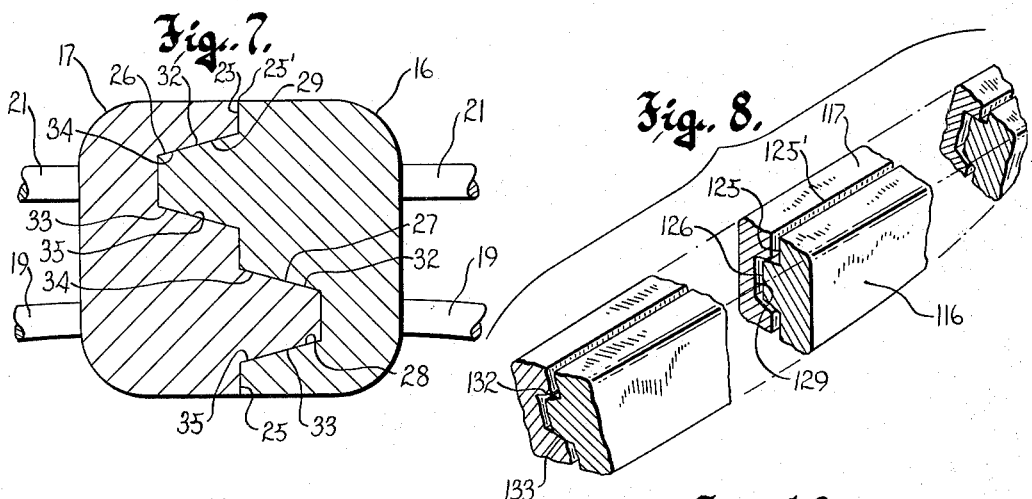
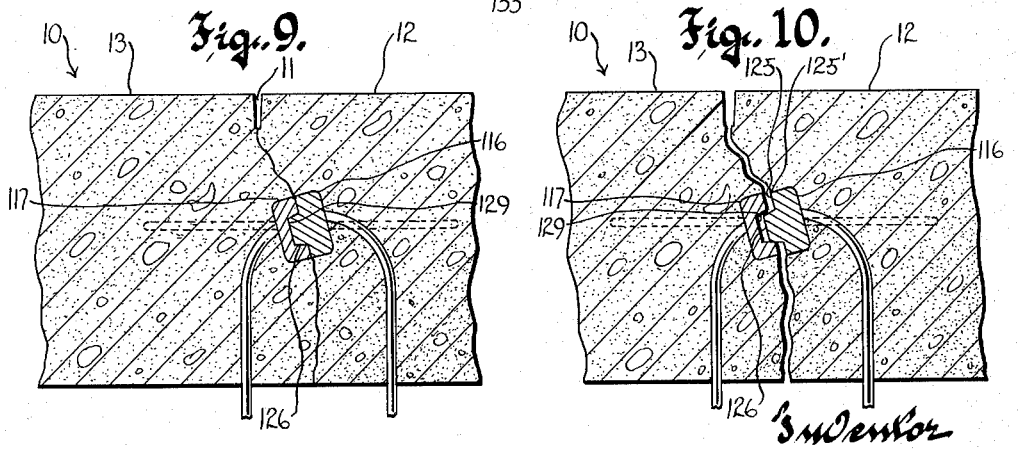

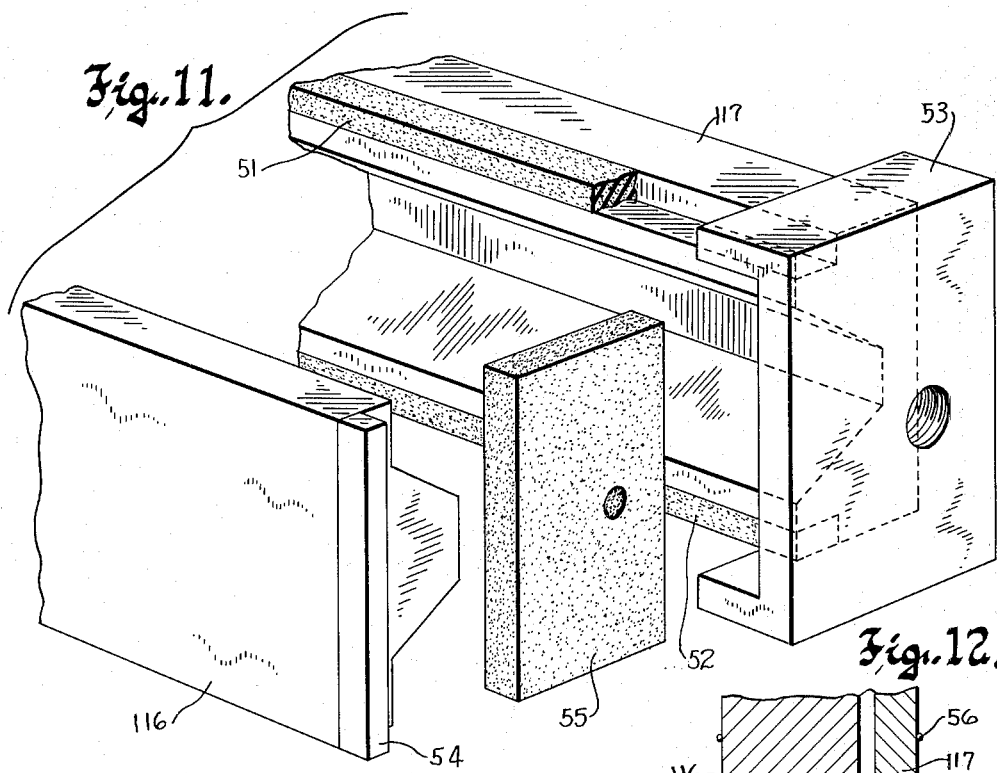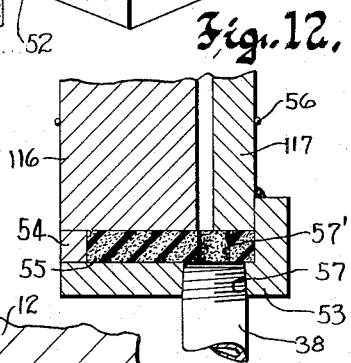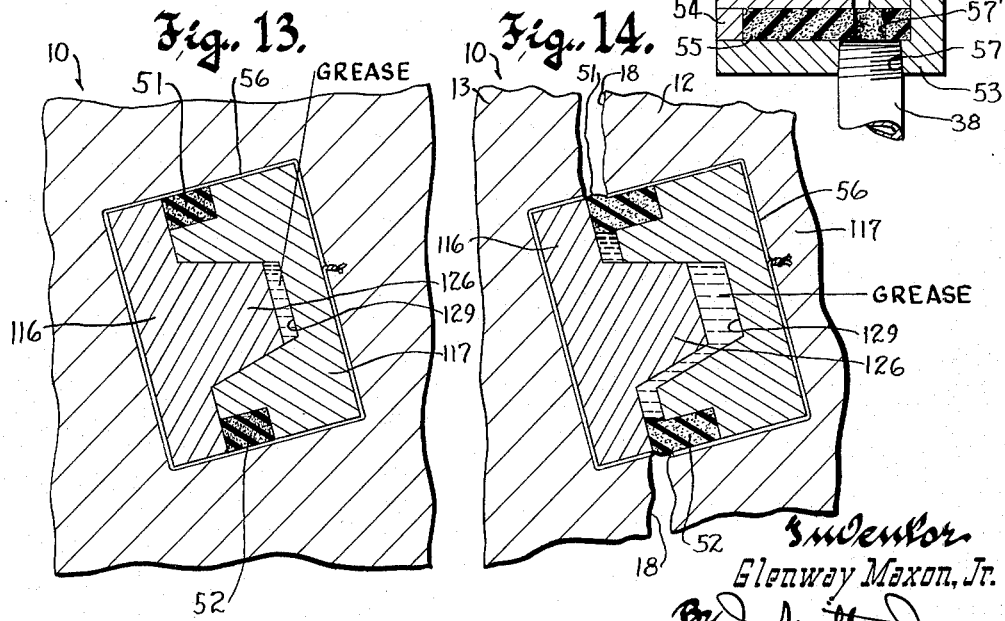

Inventor
Glenway Maxon, Jr.
By
Attorney

United States Patent Office 3,217,616
Patented Nov. 16, 1965

3,217,616
LOAD TRANSFER MEANS FOR CONTRACTION JOINTS IN CONCRETE PAVEMENT
Glenway Maxon, Jr., 1943 N. Summit Ave., Milwaukee, Wis.
Filed Nov. 1, 1962, Ser. No. 234,818
7 Claims. (Cl. 94—17)

This application is a continuation in part of my application Ser. No. 810,290, filed May 1, 1959 and now abandoned.

This invention relates to concrete pavement and refers more particularly to contraction joints in pavement of the type that is poured in a ribbon-like strip. Such pavement is extensively used for highways and airport runways, where it is required to support large moving loads.

Concrete pavement tends to shrink or contract as it cures, and when placed in an unbroken strip or ribbon, as is now common practice, such pavement would be interlaced by a network of random cracks if cracking were not controlled to form the ribbon into rectangular slabs of substantially uniform length. One method of inducing contraction cracks to form at accurately spaced locations is to saw straight transverse slits across the concrete after it has set up but before it reaches the state in its hardening when it has contracted to any appreciable extent. As the concrete shrinks, a crack tends to open downwardly from the bottom of each slit thus formed, dividing the ribbon of pavement into endwise adjacent slabs that are separated by small spaces which accommodate thermal expansion and contraction of the slabs.

Heretofore, this practice of sawing transverse slits in the surface of the ribbon has resulted in the formation of contraction cracks which extended substantially straight down from the bottoms of the slits, and consequently the adjacent surfaces of the slabs formed in this manner were substantially vertical, offering no resistance to free movement of the slabs up and down independently of one another. It was therefore customary to provide some means for connecting adjacent slabs in such a manner as to constrain them against relative heaving and subsiding while leaving them free for relative endwise motion toward and from one another in response to thermal expansion and contraction. The ususal expedient for accomplishing this has been to embed cooperating dowels and sleeves in the ribbon of concrete at zones where cracks are intended to be formed, the sleeves being embedded in the part of the ribbon intended to form the end portion of one slab and the dowels having one end portion telescopingly engaged in the sleeves and extending across the zone where a crack is to form.

The dowel-and-sleeve load transfer structure, while extensively employed as the only means heretofore available for transmitting vertical loads from one slab to another, has been a constant source of troubles and difficulties. Not only was it necessary that each dowel in a slab be accurately coaxially telescoped into its corresponding sleeve in the adjacent slab, but all of the dowels and sleeves joining a pair of slabs had to be very accurately parallel to one another in order to insure smooth telescoping motion of the dowel-and-sleeve connections as the slabs shifted lengthwise relative to one another.

Bearing in mind that the dowels and sleeves had to be set in place before the concrete was poured, and had to maintain their positions and accurate parallelism despite all of the displacing forces and stresses imposed upon them during pouring of the concrete, it will be seen that the placement of the dowels and sleeves tended to be laborious and time consuming and required expensive special harness. Moreover, even if the dowels and sleeves were accurately placed, and maintained their positions during the pouring operation, the dowel-and-sleeve connections transmitted loads from one slab to another at substantially localized areas at the ends of the slabs, with the result that the imposition of a load on the end portion of one slab tended to break away concrete above the dowel-and-sleeve connection on that slab and below the connection on the adjacent slab. This tendency toward disintegration of the slabs was greatly aggravated if the dowel-and-sleeve connections were not accurately parallel.

By contrast, it is an object of the presnet invention to provide load or force transfer means adapted to be located at each contraction joint in a concrete pavement of the character described, whereby vertical loads are transmitted from one to the other of the adjacent slabs at the contraction joint, which load or force transfer means can be quickly and easily set up on the subgrade prior to pouring of the concrete, resists displacement during pouring, and is so connected with the adjacent concrete slabs at the contraction joint as to transfer loads between substantially large areas of them so as not to induce crumbling of the concrete at such connections due to high localized forces.

It is also an object of this invention to provide a separator which is adapted to be embedded in concrete pavement of the character described, beneath the surface thereof, to define a zone of discontinuity between lengthwise adjacent portions of the pavement, extending transversely across the pavement and from which a contraction crack may be induced to originate to define adjacent slabs, which separator provides cooperating ledge-like load transfer portions on the adjacent ends of the slabs.

Another and more specific object of this invention resides in the provision of reinforcing means for a contraction joint in a concrete pavement of the character described, comprising bar-like elements extending transversely across the pavement intermediate its top and bottom surfaces and spaced inwardly of the slab from its surfaces defined by the contraction crack.

Still another object of this invention resides in the provision of transverse reinforcing bars of the type referred to in the preceding statement of object, which bars provide separators having contiguous surfaces at the adjacent faces of the slabs that cooperate to define and to induce the crack, and have cooperating ledge-like or tongue-and-groove interlocks with one another at their contiguous faces by which loads may be transmitted from one slab to the other despite the fact that the slabs may separate to some extent upon crack forming contraction of the concrete.

Another object of this invention resides in the provision of transverse reinforcing and load transfer bars of the character described which are capable of being easily lubricated to insure that adjacent slabs in a concrete pavement will be free for limited endwise movement relative to one another, to provide for thermal expansion and contraction of the concrete without imposing large friction forces upon the load transfer bars as a result of such movement.

Still another object of this invention is to provide transverse reinforcing and load transfer bars for contraction joints in pavement of the character described, by which downward loads upon a slab at one side of a contraction joint are transferred to its adjacent slab at the other side of the contraction joint, and which bars distribute the forces due to such loads over substantial areas of the two slabs and take advantage of the elasticity of the steel of which they are made to afford increased areas of load transfer engagement with increasing loads upon the slabs.

This invention has for another of its objects the provision of means for prestressing endwise adjacent slabs of concrete pavement, whereby each individual slab along the length of the pavement can be put under lengthwise compressive force at about the time the concrete in the pavement begins to cure, and can be maintained under such compressive force during the life of the pavement. The invention contemplates that the prestressing forces on endwise adjacent slabs will be applied to the slabs in such a manner as to cause a contraction crack to form between them, thus assuring that contraction cracks will be formed only at predetermined locations along the length of the pavement at which reinforcing and load transfer means of this invention have been embedded therein during placement of the pavement.

Those skilled in the art will understand that such prestressing of the individual slabs of pavement insures that they will have substantially greater strength than slabs of the same pavement which are not under such lengthwise compressive stress; hence it follows that a further object of this invention is to provide inexpensive and effective means for achieving a very superior pavement of prestressed concrete.

In this connection it is another and more specific object of this invention to provide means whereby such prestressing is effected by the same material which also serves to lubricate the reinforcing and load transfer means of this invention.

With the above and other objects in view which will appear as the description proceeds this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

FIGURE 1 is a perspective view of a section of concrete pavement, in the neighborhood of a contraction joint or crack, with portions of the pavement broken away to illustrate one form of reinforcing and load transfer means of this invention, portions of which are also shown broken away;

FIGURES 2, 3 and 4 are vertical sectional views on an enlarged scale of the pavement shown in FIGURE 1, respectively taken on the planes of the lines 2—2, 3—3 and 4—4 in FIGURE 1, and showing the pavement in the condition that exists just as a contraction crack begins to form during curing of the concrete;

FIGURES 2a, 3a and 4a are views similar to FIGURES 2, 3 and 4 respectively, but show the pavement in its condition after the contraction joint has been fully formed as a result of complete curing of the concrete;

FIGURE 5 is a cross sectional view on an enlarged scale of the load transfer means per se of FIGURES 1 through 4a;

FIGURE 6 is a fragmentary perspective view of a modified embodiment of the reinforcing and load transfer means of this invention;

FIGURE 7 is a cross sectional view of another modified embodiment of the load transfer means;

FIGURE 8 is a fragmentary perspective view, with portions broken away, of still another modified embodiment of the load transfer and reinforcing means;

FIGURE 9 is a cross sectional view through a pavement incorporating the load transfer means illustrated in FIGURE 8, the pavement being shown in the condition that obtains just as contraction begins;

FIGURE 10 is a view similar to FIGURE 9 but showing the pavement in its fully cured condition, with a contraction crack fully developed;

FIGURE 11 is a disassembled perspective view of another modified form of reinforcing and load transfer means with which endwise adjacent pavement slabs can be prestressed;

FIGURE 12 is a fragmentary longitudinal sectional view of the apparatus illustrated in FIGURE 11, taken on a horizontal plane through the center line thereof;

FIGURE 13 is a cross section view of the reinforcing and load transfer means shown in FIGURE 11, embedded in a concrete pavement and in its condition just after placement of the concrete;

FIGURE 14 is a view similar to FIGURE 13 but showing the conditions that obtain after the pavement is cured and prestressed.

Figure 15A:
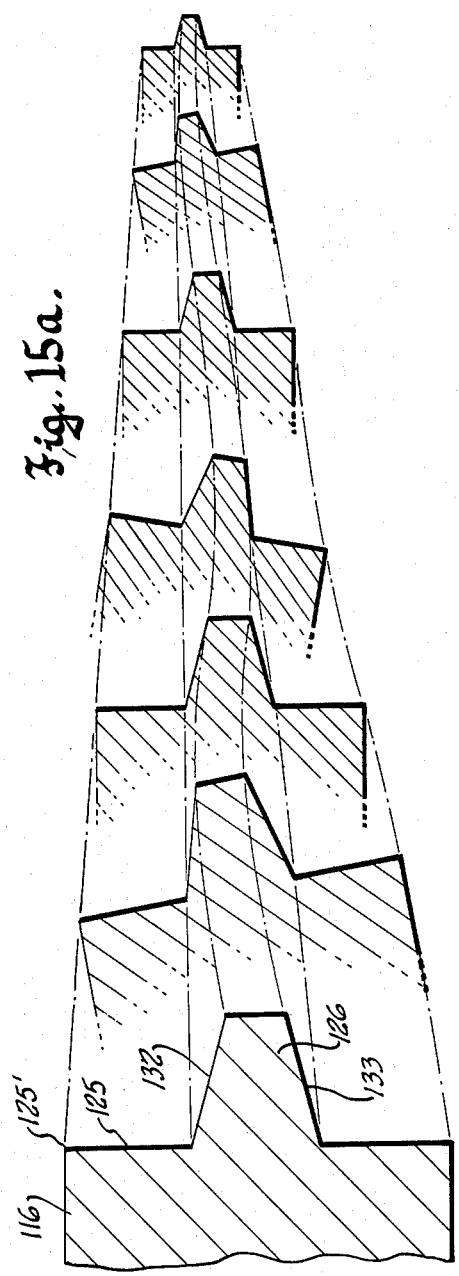
FIGURES 15a and 15b are more or less diagrammatic views on an enlarged scale of a pair of cooperating load transfer members of this invention with cross-sectional profiles indicated at various points along the length of each member.

Referring now more particularly to the accompanying drawings, in which like reference characters have been applied to like parts throughout the several views, the numeral 10 generally designates a section of concrete pavement which is formed by placement of a continuous ribbon of concrete between parallel side forms, not shown.

As is coneventional, the pavement is provided at uniformly spaced intervals along its length with transversely extending surface slits, such as indicated at 11, which extend entirely thereacross. These slits are for the purpose of inducing cracks which result from the contraction of the concrete as it sets, and which cracks separate the pavement into lengthwise adjacent slabs 12 and 13.

The slits 11, only one of which is shown, may be defined in any conventional manner, such as by sawing a straight cut of uniform depth into the surface of the pavement after the concrete has set up but before it hardens to the point where shrinkage commences. In some cases it may be advantageous to form the slits 11 by means of thin separator strips, which may be embedded in the concrete either as or shortly after it is placed, and which are removed from the concrete shortly after it is set up, or after it has hardened.

In any event, the transverse cracks which the slits induce would normally extend down into the concrete from the bottom of the slit 11 along more or less vertical lines.

According to the present invention, however, a pair of opposing reinforcing and load transfer bars 16 and 17 are embedded in the concrete directly beneath each slit 11 and spaced below the bottom thereof, and the opposing faces of these bars define a discontinuity in the pavement which encourages the formation of a crack 18 of such configuration that it extends both downwardly and upwardly from the bars along lines that form substantially extensions of their opposing faces.

Since the bars must be embedded in the concrete in spaced relation to its top and bottom surfaces, and must be held in place while the concrete is being poured, they are provided with legs or "chairs" 19 which extend generally downwardly from them and the lower extremities of which are adapted to rest upon the subgrade upon which the concrete is poured. These "chairs" can comprise rods that are suitably bent and which are welded to the bars at spaced intervals along their length.

Pairs of reinforcing and load transfer bars 16 and 17 can thus be set in place upon the subgrade before pouring begins. Their locations can be marked on the forms between which the concrete is poured to facilitate formation of a slit 11 in the surface of the concrete directly above each pair of bars. In the finished pavement the "chairs" 19 serve to bind and secure the bars 16 and 17 to the respective slabs 12 and 13. In addition to the "chairs," rod-like reinforcing elements 21 can be secured to the bars to extend generally laterally and horizontally from them into the slabs, and such rod-like elements can have curved or hook-like extremities 22 to further bind the bars to the slabs.

As traffic moves along the pavement from slab to slab, the downward loads imposed upon each slab in turn should be transfered across the contraction joints at the ends of the slab to each of its adjacent slabs, to provide the greatest possible dispersal of the load forces across the subgrade; and it is the purpose of the bars 16 and 17 to effect such slab-to-slab load transfer in addition to providing a degree of transverse reinforcing to the pavement.

In the case of the structure shown in FIGURES 1 through 5, each of the bars has a generally upright front face 25 that extends along its entire length, and has a tongue which also extends along its entire length, and which projects forwardly from said face into a mating forwardly opening groove in the other bar. The tongue on the bar 16 is designated by reference numeral 26, that on bar 17 by bar 27; while the groove in bar 16, which receives tongue 27, is designated 28, and the groove in bar 17 by 29. Thus the tongue on each bar is vertically spaced from the groove therein, the tongue on bar 16 being above the grove 28 while that on bar 17 is below the groove 29.

Each bar is sinuously twisted along its length in a peculiar manner now about to be described, to provide lengthwise spaced apart opposing horizontal load transfer sufrace areas on the two bars.

The twist in each bar is such that the upper edge 25' of its front face 25 lies on a straight line, while the lower edge of its front face lies on a line that is sinuously curved alternately to opposite sides of a vertical plane through said straight line.

Figure 15B:
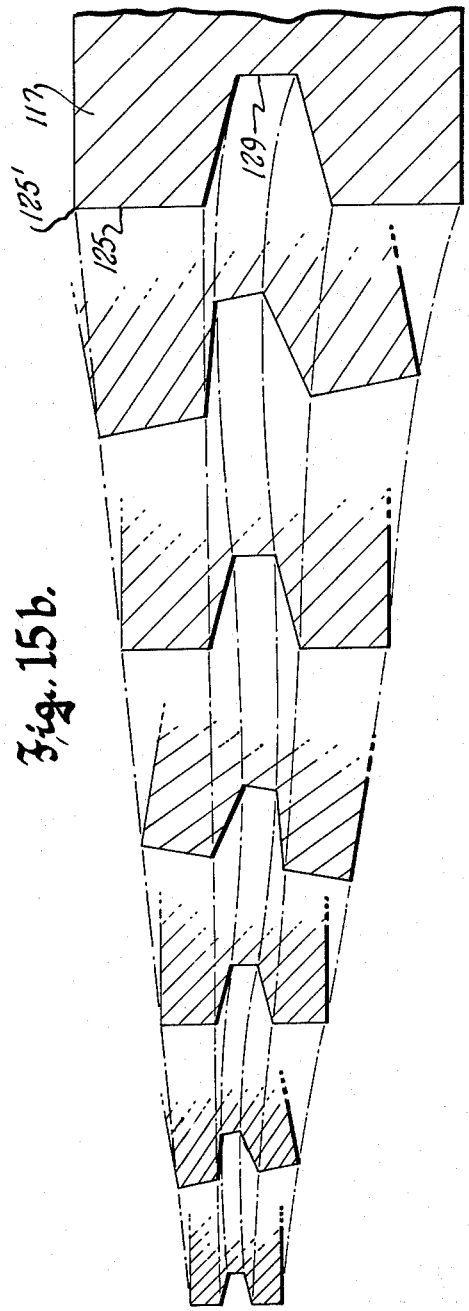

The tongue on each bar likewise has a regular alternating twist along the length of the bar, and the grooves having correspondingly twisted surfaces so that they can matingly receive the tongues. Specifically, the tongue on each bar is, at every cross section along its length, symmetrical about a line 31 that is exactly normal to the front face 25 of the bar. In other words, the tongue has a uniform isosceles trapezoidal cross section along its length, as best seen FIGURE 15a, with the base of the trapezoid at every point lying in the plane of the front face. The groove, of course, is provided with an alternating twist corresponding to that of the tongue with which it mates and it likewise has a uniform isoceles trapezoidal cross section along its length, as best seen in FIGURE 15b.

It is important to observe that the top and bottom surfaces 32 and 33 of the tongue on each bar converge forwardly, and that they therefore define obtuse angles to the front face 25 of the bar. The top and bottom surfaces 34 and 35 of each groove similarly converge rearwardly from the front face of the bar. At each cross section of the bar the top and bottom surfaces 32 and 33 of the tongue are bisected by the line 31, which is exactly perpendicular to the front face 25 of the bar at that cross section, and hence at each cross section, the tongue is symmetrical about a line 31 that is at a slightly different angle to the vertical than the bisector lines 31 of its adjacent cross sections. Because of the above described twist in the front face 25, every line 31 can be said to be tangent to an imaginary cylindrical surface concentric with the upper edge 25' of the front face 25 of the bar, and to intersect a sinuous alternately upwardly and downwardly curving line lying in a vertical plane spaced forwardly of the front face of the bar.

The angle of convergence of the top and bottom surfaces 32 and 33 of the tongue is so chosen that at the points of maximum forward twist of the front face of the bar (see bar 16 in FIGURES 3 and 3a) the upwardly facing surfaces of the tongue and groove are exactly horizontal, and at the points of maximum rearward twist of the front face of the bar (see the bar 16 in FIGURES 4 and 4a) the downwardly facing surfaces of the tongue and groove are horizontal.

Thus each bar has small areas of horizontal downwardly facing surface at spaced intervals along its length, alternating with similar areas of upwardly facing horizontal surface, and the horizontal surface areas on one bar opposingly engage those on the other bar, in vertical load transfer relation to them. Because these surfaces on the two bars are exactly horizontal, they remain in such load transfer engagement with one another, even after the adjacent slabs in which they are embedded have lengthwise shrunk apart, as may be seen by comparison of FIGURES 3 and 4 with FIGURES 3a and 4a.

Lengthwise intermediate the zones of each bar at which its tongue has upwardly facing and downwardly facing horizontal surfaces, respectively, the bar has a zone in which its front face is perfectly upright, as illustrated in FIGURE 2, and in which the top and bottom surfaces of its tongue and groove are all inclined to the horizontal. In this latter zone, as illustrated in FIGURE 2a, the bars have no contact with one another after shrinkage of the concrete takes place.

It will now be apparent that downward loads on slab 12 will be transmitted to slab 13 at a number of points across the width of the pavement, at each of which the bars are twisted to the cross section illustrated in FIGURES 4 and 4a, in which horizontal downwardly facing surface portions on the tongue and groove of bar 17 engage opposing horizontal surfaces on bar 16. Similarly, downward loads on slab 13 will be transferred to slab 12 at a number of points across the width of the pavement, at each of which the bars have the cross section illustrated in FIGURES 3 and 3a, with horizontal downwardly facing surface portions on bar 17 opposingly engaging upwardly facing horizontal surface portions on bar 16. Because of the inherent resiliency of the steel of which the bars are made and the peculiar alternating twists of their tongues along their lengths, each tongue can flex or deform slightly with the imposition of increasing load forces upon it, so as to increase the amount of horizontal surface area with which it engages its mating groove surface.

Preferably, each bar is first made as a straight member which is rolled or otherwise formed to the desired cross sectional profile, providing it with a flat front face, a tongue and a groove; and thereafter it is twisted in alternate directions at regular intervals along its length, the twisting being effected in such a manner that the upper edge 25' of the front face 25 of the bar defines the axis of twist in each direction and remains straight at the conclusion of the operation.

Rearwardly of the generally upright front surface 25 the bars can have any desired cross sectional shape. In the embodiment of the invention illustrated in FIGURES 1 through 5, each of the bars has a generally W-shaped cross-sectional profile behind its front face, so that the two bars together define generally a figure "8" outline. This configuration has the advantage of being relatively economical of material. In the embodiment of the invention illustrated in FIGURE 6, each bar has a semi-circular outline behind its front face; while FIGURE 7 illustrates bars which cooperate to define a generally square or rectangular outline. As suggested by FIGURE 6, the outer surfaces of the bars, which engage the concrete, may be provided with ridges 37, or with grooves or other roughening, to provide a better bond with the concrete.

As the pavement in which the bars are embedded contracts and expands with changes in temperature, the horizontal load transfer surfaces slide upon one another. To minimize friction due to such sliding motion, and thus prevent the bars from being pulled out of the slabs in which they are embedded, the interengaging portions of the bars are preferably greased before the load transfer means is set in place on the subgrade. As illustrated in FIGURES 2, 2a and 5, means can also be provided for greasing the bars from time to time after the pavement is laid, comprising a tube 38 leading to the upper surface of the pavement and communicating with a transverse bore 39 in one of the bars, opening to its front face intermediate its tongue and groove. Such lubrication means can be provided at each contraction joint, at intervals across the width of the pavement, and each can be provided with a suitable cap 40, the upper surface of which lies flush with the top of the pavement.

In each of the embodiments of the invention described up to this point the two bars comprising each load transfer means can be initially formed identical with one another, since each has a tongue and a groove, and the two can then be twisted, simultaneously if desired, to provide them with complementary inclinations at all points along their lengths. However, in the embodiment of the invention illustrated in FIGURES 8–10, the bar 116 is provided with a tongue 126 but no groove, while the bar 117 has only a groove 129 to receive the tongue 126. As in the previously described embodiments of the invention, each bar is alternately twisted back and forth along its length about an axis defined by the upper edge 125' of its front face 125, to provide lengthwise spaced apart upwardly and downwardly facing horizontal surface portions which alternate with one another along the length of the bar and which have load transfer engagement with opposing horizontal surface portions on the other bar.

In the embodiment of the invention shown in FIGURES 8–10, the tongue again has forwardly converging top and bottom surfaces 132 and 133 which are symmetrical, at each cross section, about a line perpendicular to the generally upright front face of bar 116, and the groove in bar 117 is of course formed with correspondingly converging top and bottom surfaces to mate with the tongue.

While the bars of the load transfer means illustrated in FIGURES 8–10 are shown as having their exterior surfaces so shaped that they cooperate in defining substantially a square or rectangular cross section, they can of course be given other shapes, as in the case of the load transfer means illustrated in FIGURES 1–7.

In the embodiment of the invention illustrated in FIGURE 11, the bars comprising the load transfer means are shown as being generally similar to those of FIGURES 9 and 10, but sealing means cooperate with the bars to prevent lubricating material under pressure from escaping from the space between them. Such sealing means can comprise upper and lower resilient strips 51 and 52, respectively, which are confined between the opposing upright faces of the mating bars, above and below their tongue and groove connection. End seals are also provided at each end of the load transfer means comprising a cap-like metal member 53 secured to one of the bars, a complementary closure member 54 secured to the other bar, and a resilient end seal 55 which is held engaged against the adjacent ends of both bars by the cap member 53. The several sealing elements 51, 52 and 55 are preferably made of a material such as fine-celled neoprene sponge, and the elongated sealing strips 51 and 52 are preferably glued or otherwise bonded to both bars to insure against their displacement.

In this embodiment of the invention lubrication tubes 38 are again provided, leading to the surface of the pavement, to permit heavy grease or the like to be injected between the bars under pressure after the pavement is placed. If desired such tubes can communicate with the space between the bars through the cap member 53 and end seal 55, which are provided with registering holes 57 and 57' for that purpose. (See FIGURE 12.) The sealing elements of course prevent the escape of the high pressure lubricant from the space between the bars. Injection of lubricant under very high pressure just as curing begins exerts a spreading force upon the bars which induces formation of a crack between the adjacent slabs of pavement connected by the bars and which imposes endwise prestressing forces upon the slabs.

To insure a good seal between the bars, they are initially held together, with the sealing strips 51 and 52 under substantial transverse compression, by wire loops 56 or similar bands that encircle the two bars comprising each load transfer means. The loops or bands 56 should have sufficient strength to hold the sealing strips under compression and to resist displacement of the bars relative to one another during placement of the pavement, but should be readily frangible in response to the force with which the lubricant injected between the bars forces them apart. It will be apparent that the bars can be made sufficiently shorter than the width of the pavement so that all of the sealing elements including the end seals will be confined within the concrete, which helps to prevent displacement of the seals under the force of the lubricant injected between the bars.

Obviously the lubrication tubes 38 are provided with suitable check valves, and an additional charge of grease will be injected between the bars after the pavement has substantially cured, and from time to time thereafter as may be necessary to maintain the adjacent slabs under lengthwise prestressing compression.

From the foregoing description taken together with the accompanying drawings it will be apparent that this invention provides load transfer means for contraction joints in concrete pavement placed as a continuous ribbon whereby loads on each of the adjacent slabs at a contraction joint are transferred to the other, and whereby such loads are transferred into and out of the slabs over substantial areas thereof, thus preventing localized load forces upon the slabs by which the concrete might be crumbled. It will also be apparent that the load transfer means of this invention can be easily and inexpensively made, can be readily set in place prior to pouring, and tends to remain in place during pouring, and that simple and effective provision can be made for greasing the load transfer means from time to time after the pavement is finished, and even for prestressing the pavement by injection of the lubricant under sufficiently high pressure.

What is claimed as my invention is:

1. Load transfer means for concrete pavement of the type having transverse contraction joints extending entirely thereacross and separating the pavement into lengthwise adjacent slabs at opposite sides of each crack, said load transfer means being adapted to be embedded in pavement at a contraction joint, intermediate the top and bottom surfaces of the pavement, to transfer downward loads on each of the slabs to its adjacent slab, said load transfer means comprising:

A. a pair of complementary elongated bars, each having a front face adapted to oppose the front face on the other bar and the upper edge of which defines a straight line that extends lengthwise of the bar;

B. a tongue on one of said bars projecting forwardly from its front face and extending along its length, said tongue having a substantially uniform trapezoidal cross secion with forwardly converging upper and lower surfaces which twist along their lengths, the front edges of said tongue being spaced apart by a uniform distance therealong and being sinuously curved alternately upwardly and downwardly along their lengths by reason of the twists in the upper and lower tongue surfaces, the twists in said tongue surfaces being so related to the angle of convergence of said surfaces that the upper surface of the tongue at the uppermost crests of the sinuosities in its front edges is parallel to the lower surface of the tongue at the lowermost crests of said sinuosities;

C. said other bar having a groove opening to its front face that is shaped in correspondence with the tongue and in which said tongue is receivable with surface portions on the tongue at the crests of its sinuosities engaging opposing surface portions of the groove in load transfer relation thereto.

2. The load transfer means of claim 1, further characterized by:
   A. a tongue on said other bar projecting forwardly from its front face, laterally spaced from said groove and substantially identical with the tongue on the first designated bar; and
   B. said first designated bar having a groove opening to its front face, laterally spaced from the tongue thereon, and in which said tongue on said other bar is received.

3. The load transfer means of claim 1, further characterized by elongated legs extending rearwardly and downwardly from each of the bars, by which the bars can be supported on a subgrade prior to pouring of concrete pavement and which become embedded in the pavement to secure the bars to pavement slabs defined by formation of contraction joints in the pavement.

4. The load transfer means of claim 1 further characterized by elongated reinforcements extending generally rearwardly from each of the bars, at spaced intervals along the length of the bar, each of said reinforcements having a hooked end portion and being adapted to be embedded in concrete pavement to bind the bar to a slab at a contraction joint in the pavement.

5. In a concrete pavement having transverse contraction cracks extending entirely thereacross, by which the pavement is separated into lengthwise adjacent slabs at opposite sides of each crack, means embedded in the concrete at a crack and extending transversely across the pavement at a distance below the surface thereof for transferring downward loads across the crack from each of the adjacent slabs at the crack to the other, said load transfer means comprising:
   A. a pair of complementary bars, one embedded in each of the pair of adjacent slabs, said bars opposing one another across the crack between said slabs,
      (1) each of said bars having a generally upright face surface opposing a similar face surface on the other bar, said face surface on each bar having its upper edge on a straight line and being alternately twisted in opposite directions along the length of the bar to have its lower edge sinuously curved back and forth along the length of the bar, and
      (2) the two bars having the twists in their opposing face surfaces complementary in direction and angle so as to mate with one another;
   B. a tongue on one of said bars projecting forwardly from its face surface and extending lengthwise along the bar, said tongue having a uniform isosceles trapezoidal cross section along its length with the base of the trapezoid lying in the plane of the face surface at every point along the length of the bar so that the upper and lower surfaces of the tongue are alternately twisted in opposite directions along its length and the front edges of the tongue are sinuously curved alternately upwardly and downwardly along its length, the upper and lower surfaces of the tongue converging forwardly at an angle such that the upper surface of the tongue at the uppermost crests of the sinuosities of its front edges is parallel to its lower surface at the lowermost crests of its sinuosities whereby said parallel surface portions of the tongue are disposed substantially horizontally; and
   C. the other bar having a groove opening to its upright face surface in which said tongue on the first designated bar is received and which groove is so shaped as to mate with said tongue and provide horizontal downwardly and upwardly facing groove defining surface portions which respectively engage and oppose said upwardly and downwardly facing horizontal surface portions on the tongue in load transfer relationship thereto.

6. The concrete pavement of claim 1, further characterized by rod-like projections on each of said bars extending generally rearwardly from the bar into the slab in which it is embedded and by which a secure connection between the bar and the slab is maintained.

7. The concrete pavement of claim 5, further characterized by the following:
   A. resilient seal means overlying the top, bottom and ends of said complementary bars to cooperate with the bars in defining an expansible pressure chamber, opposite wall portions of which are provided by said opposing face surfaces on said bars;
   B. duct means extending through one of said bars to the pressure chamber and to the surface of the slab in which said one bar is embedded, for injecting fluid under pressure into the pressure chamber; and
   C. check valve means in said duct means for maintaining fluid in said chamber under pressure so that the force which such fluid exerts upon the bars is transmitted to the respective slabs in which they are embedded, to endwise prestress the slabs.

References Cited by the Examiner

UNITED STATES PATENTS

| | | | |
|---|---|---|---|
| 939,403 | 11/1909 | Dudley | 50—524 |
| 1,202,335 | 10/1916 | Varney | 50—524 |
| 1,825,021 | 9/1931 | Strand | 94—17 |
| 2,133,387 | 10/1938 | Heltzel | 94—18 |
| 2,194,383 | 3/1940 | Clark | 94—18 |
| 2,251,672 | 8/1941 | Friberg | 94—24 |
| 2,330,213 | 9/1943 | Heltzel | 94—18 |
| 2,330,214 | 9/1943 | Heltzel | 94—17 |
| 2,419,022 | 4/1947 | Heltzel | 94—18 |
| 2,910,921 | 11/1959 | Freyssinet | 94—8 |

JACOB L. NACKENOFF, *Primary Examiner.*

BENJAMIN BENDETT, RICHARD W. COOKE,
*Examiners.*